Patented Dec. 1, 1925.

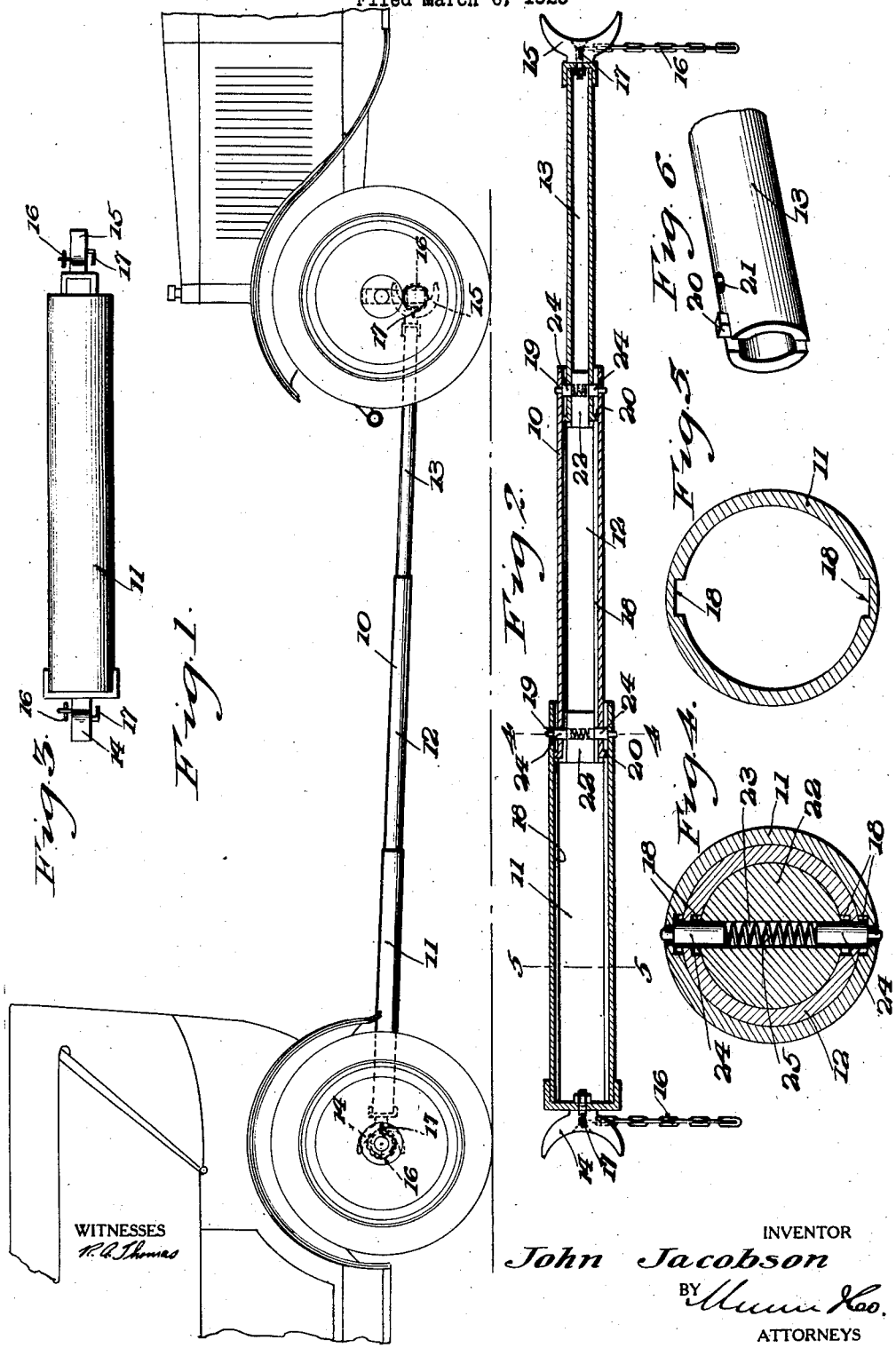

1,563,860

UNITED STATES PATENT OFFICE.

JOHN JACOBSON, OF COLUMBIA FALLS, MONTANA.

TOW ROD.

Application filed March 6, 1925. Serial No. 13,545.

*To all whom it may concern:*

Be it known that I, JOHN JACOBSON, a citizen of the United States, and a resident of Columbia Falls, in the county of Flathead and State of Montana, have invented certain new and useful Improvements in Tow Rods, of which the following is a specification.

My present invention relates generally to means for towing automobiles and like vehicles and more particularly to a tow rod or bar readily attachable to machines of this character and which my invention aims to provide in sectional form whereby it may be easily and conveniently carried as part of automobile equipment and readily extended to its effective position when desired for use.

In the accompanying drawing, illustrating my invention and forming a part of this specification, Figure 1 is a side view illustrating the practical application of my invention.

Figure 2 is a central longitudinal section through my improved tow rod in its extended effective position.

Figure 3 is a side view thereof in the collapsed position.

Figures 4 and 5 are detail transverse sections taken respectively on lines 4—4 and 5—5 of Figure 2, and Figure 6 is a detail perspective view of the inner end of one of the inner sections.

Referring now to these figures, my invention proposes a tow rod 10 composed of a series of tubular telescopic sections 11, 12 and 13, the rod 10 having at its opposite ends yoke-shaped bumpers or engaging members 14 and 15 respectively carried by and swively connected to the sections 11 and 13. In connection with these bumpers 14 and 15 are attaching chains 16 or similar attaching members to encircle portions of an automobile, as for the axle, as shown in Figure 1. These chains are secured at one end to one side of the bumpers 14 and 15 and are readily and adjustably engageable at their opposite ends with hooks 17 at the opposite sides of the bumpers.

Each of outer and central sections 11 and 12 has its inner surface longitudinally grooved as at 18 at diametrically opposite points and is further provided adjacent to one end with diametrically opposed wall openings 19 in line with its grooves 18. Each of the central and inner sections 12 and 13 has at its inner end diametrically outstanding lugs 20 slidably interfitting the grooves 18 and with openings 21 adjacent to, and alined with, the lugs 20 as seen in Figure 6.

Moreover, each of the central and inner sections 12 and 13 has secured within its inner end a cylindrical block 22 transversely bored as at 23 in alinement with the openings 21. The bore of each block receives in its opposite ends pins 24 which are thus in line with, and travel within, the internal grooves 18. Between the pins 24 in each bore is a coil spring 25 which tends to force the pins outwardly so that when the sections are pulled outwardly with respect to one another to the extended or effective position shown in Figure 1, the outer reduced ends of the pins 24 will be forced outwardly by the springs 25 and into the locking apertures 19, thus securely holding the several sections 11, 12 and 13 in such position against danger of pulling apart and likewise against telescoping or collapsing movement.

Thus in its effective position, my improved tow rod will be strongly held and sufficiently rigid. In view of its end connections it may be readily attached and removed and it is obviously simple and inexpensive considering that it may be easily and quickly collapsed and in such condition is adapted to be easily carried as a part of the regular equipment on tour or even under ordinary conditions of every day use.

I claim:

1. A tow rod including a series of tubular telescoping sections having cooperating guide means including internal grooves lengthwise of certain of the sections and outstanding lugs carried by certain sections and slidable in said grooves, said sections also having locking pins and openings engageable with one another whereby to lock the sections in the extended effective position.

2. A tow rod including a series of tubular telescoping sections having cooperating guide means including internal grooves lengthwise of certain of the sections and outstanding lugs carried by certain sections and slidable in said grooves, said sections also having locking pins and openings engageable with one another whereby to lock the sections in the extended effective position, said last named pins and openings being alined with the grooves, the latter acting as guides for the locking pins.

3. A tow rod including a series of tubular telescoping sections having cooperating guide means preventing independent rotation thereof and certain thereof having locking apertures, certain of said sections also having openings adjacent to one end and a cylindrical plug fixed in said end and transversely bored in alinement with said openings, locking pins within, and projecting from the ends of said bore, through said openings for engagement within said locking apertures, and springs in said bores between and bearing outwardly against said pins.

JOHN JACOBSON.